US010282462B2

(12) United States Patent
Magnani et al.

(10) Patent No.: US 10,282,462 B2
(45) Date of Patent: May 7, 2019

(54) SYSTEMS, METHOD, AND NON-TRANSITORY COMPUTER-READABLE STORAGE MEDIA FOR MULTI-MODAL PRODUCT CLASSIFICATION

(71) Applicant: Wal-Mart Stores, Inc., Bentonville, AR (US)

(72) Inventors: Alessandro Magnani, Menlo Park, CA (US); Tom Ben Zion Zahavy, Haifa (IL); Abhinandan Krishnan, Sunnyvale, CA (US); Shie Mannor, Haifa (IL)

(73) Assignee: WALMART APOLLO, LLC, Bentonville, AR (US)

( * ) Notice: Subject to any disclaimer, the term of this patent is extended or adjusted under 35 U.S.C. 154(b) by 202 days.

(21) Appl. No.: 15/339,711

(22) Filed: Oct. 31, 2016

(65) Prior Publication Data

US 2018/0121533 A1   May 3, 2018

(51) Int. Cl.
*G06F 17/30* (2006.01)
*G06N 3/08* (2006.01)

(52) U.S. Cl.
CPC .. *G06F 17/30598* (2013.01); *G06F 17/30554* (2013.01); *G06F 17/30867* (2013.01); *G06N 3/08* (2013.01)

(58) Field of Classification Search
CPC ..................... G06F 17/30864; G06F 17/30867
USPC ................................................ 707/706, 722
See application file for complete search history.

(56) References Cited

U.S. PATENT DOCUMENTS

| | | | | |
|---|---|---|---|---|
| 8,311,957 | B2 * | 11/2012 | Kirshenbaum | G06N 5/02 706/12 |
| 8,355,997 | B2 * | 1/2013 | Kirshenbaum | G06N 5/02 706/12 |
| 2006/0064411 | A1 * | 3/2006 | Gross | G06F 17/30864 |
| 2008/0168135 | A1 * | 7/2008 | Redlich | G06Q 10/10 709/204 |

(Continued)

OTHER PUBLICATIONS

T. Zahavy et al., "Is a Picture Worth a Thousand Words? A Deep Multi-Modal Fusion Architecture for Product Classification in E-Commerce," arXiv:1611.09534, Ver. 1 (Nov. 29, 2016).

(Continued)

*Primary Examiner* — Jean M Corrielus
(74) *Attorney, Agent, or Firm* — Bryan Cave Leighton Paisner LLP

(57) ABSTRACT

A multi-modal computer classification network system for use in classifying data records is described herein. The system includes a memory device, a first classification computer server, a second classification computer server, and a policy computer server. The memory device includes an item records database and a labeling database. The first classification computer server includes a first classifier program that is configured to select an item record from the item database and generate a first classification record including a first ranked list of class labels. The second classification computer server includes a second classifier program that is configured to generate a second classification record including a second ranked list of class labels. The policy computer server includes a policy network that is programmed to determine a predicted class label based on the first and second ranked lists of class labels.

20 Claims, 11 Drawing Sheets

(56) References Cited

U.S. PATENT DOCUMENTS

| | | | | |
|---|---|---|---|---|
| 2011/0055008 | A1* | 3/2011 | Feuerstein | G06Q 30/02 705/14.51 |
| 2011/0103682 | A1* | 5/2011 | Chidlovskii | G06K 9/6284 382/159 |
| 2011/0119208 | A1* | 5/2011 | Kirshenbaum | G06N 5/02 706/12 |
| 2011/0119209 | A1* | 5/2011 | Kirshenbaum | G06N 5/02 706/12 |
| 2014/0317078 | A1* | 10/2014 | Gallagher | G06F 17/30867 707/706 |
| 2015/0112790 | A1* | 4/2015 | Wolinsky | G06Q 30/0238 705/14.38 |
| 2016/0306890 | A1* | 10/2016 | Yuan | G06F 17/30864 |
| 2016/0321365 | A1* | 11/2016 | Duan | G06F 17/30867 |
| 2016/0321716 | A1* | 11/2016 | Ravikant | G06Q 30/0601 |
| 2016/0378838 | A1* | 12/2016 | Shrivastava | G06Q 30/0623 707/722 |
| 2017/0124615 | A1* | 5/2017 | Magnani | G06Q 30/0609 |
| 2017/0372413 | A1* | 12/2017 | Feuerstein | G06Q 30/02 |

OTHER PUBLICATIONS

Y. Bengio et al., "Representation Learning: A Review and New Perspectives," arXiv:1206.5538, Ver. 3 (Apr. 23, 2014).
A. Conneau et al., "Very Deep Convolutional Networks for Natural Language Processing," arXiv:1606.01781, Ver. 1 (Jun. 6, 2016).
A. Frome et al., "Devise: A Deep Visual-Semantic Embedding Model," Advances in Neural Information Processing Systems 26 (2013).
Y. Gong et al., "Improving Image-Sentence Embeddings Using Large Weakly Annotated Photo Collections," European Conference on Computer Vision vol. 8692, pp. 529-545, Springer International Publishing (2014).
M. Guillaumin et al., "Multimodal Semi-Supervised Learning for Image Classification," CVPR 2010—23rd IEEE Conference on Computer Vision & Pattern Recognition, pp. 902-909, IEEE Computer Society (2010).
L. K. Hansen and P. Salamon, "Neural Network Ensembles," IEEE Transactions on Pattern Analysis and Machine Intelligence, vol. 12, Issue 10, pp. 993-1001 (1990).
K. He et al., "Deep Residual Learning for Image Recognition," arXiv:1512.03385, Ver. 1 (Dec. 10, 2015).
A. Kannan et al., "Improving Product Classification Using Images," 2011 IEEE 11th International Conference on Data Mining (Dec. 11-14, 2011).
Y. Kim, "Convolutional Neural Networks for Sentence Classification," arXiv:1408.5882, Ver. 2 (Sep. 3, 2014).
R. Kiros et al., "Multimodal Neural Language Models," Proceedings of the 31st International Conference on Machine Learning, Beijing, China, JMLR: W&CP, vol. 32 (2014).
J. Kittler et al., "On Combining Classifiers," IEEE Transactions on Pattern Analysis and Machine Intelligence, vol. 20, Issue 3, pp. 226-239 (Mar. 1998).
A. Krizhevsky et al., "ImageNet Classification with Deep Convolutional Neural Networks," Advances in Neural Information Processing Systems 25 (2012).
S. Lai et al., "Recurrent Convolutional Neural Networks for Text Classification," Proceeding of the Twenty-Ninth AAAI Conference on Artificial Intelligence (2015).
C. Lynch et al., "Images Don't Lie: Transferring Deep Visual Semantic Features to Large-Scale Multimodal Learning to Rank," arXiv:1511.06746, Ver. 1 (Nov. 20, 2015).
L. van der Maaten and G. Hinton, "Visualizing Data Using t-SNE," Journal of Machine Learning Research, vol. 9, pp. 2579-2605 (Nov. 2008).
J. Ngiam et al., "Multimodal Deep Learning," Proceedings of the 28th International Conference on Machine Learning (ICML-11), pp. 689-696 (2011).
S. Poria et al., "Fusing Audio, Visual and Textual Clues for Sentiment Analysis From Multimodal Content," Neurocomputing vol. 174, pp. 50-59 (2016).
H. Pyo et al., "Large-Scale Item Categorization in E-Commerce Using Multiple Recurrent Neural Networks," Proceedings of the 22nd ACM SIGKDD International Conference on Knowledge Discovery and Data Mining, pp. 107-115 (Aug. 13-17, 2016).
O. Russakovsky et al., "ImageNet Large Scale Visual Recognition Challenge," arXiv:1409.0575, Ver. 3 (Jan. 30, 2015).
K. Simonyan and A. Zisserman, "Very Deep Convolutional Networks for Large-Scale Image Recognition," arXiv:1409.1556, Ver. 6 (Apr. 10, 2015).
R. K. Srivastava et al., "Highway Networks," arXiv:1505.00387, Ver. 2 (Nov. 3, 2015).
C. Szegedy et al., "Intriguing Properties of Neural Networks," arXiv:1312.6199, Ver. 4 (Feb. 19, 2014).
Y. Xiao and K. Cho, "Efficient Character-Level Document Classification by Combining Convolution and Recurrent Layers," arXiv:1602.00367, Ver. 1 (Feb. 1, 2016).
X. Zhang et al., "Character-Level Convolutional Networks for Text Classification," arXiv:1509.01626, Ver. 3 (Apr. 4, 2016).
Y. Zhang and B. Wallace, "A Sensitivity Analysis of (and Practitioners' Guide to) Convolutional Neural Networks for Sentence Classification," arXiv:1510.03820, Ver. 4 (Apr. 6, 2016).

* cited by examiner

| Item ID | Text Metadata | Image Metadata | Video Metadata | Audio Metadata |
|---|---|---|---|---|
| 001 | title001, description001.txt | Image001, image101.png | Video001.mov | audiofile001.wav |
| 002 | title002, description002.txt | Image002, image202.png | Video002.mov | audiofile002.wav |
| 003 | title003, description003.txt | Image003, image303.png | Video003.mov | audiofile003.wav |

FIG. 8

| Class Label | Text Definition | Image Definition |
|---|---|---|
| Tablet Computer | Text1001.txt | Image1001.png |
| Notebook Computer | Text1002.txt | Image1002.png |
| Laptop Computer | Text1012.txt | Image1012.png |

FIG. 9

| Item ID | Predicted Class Label | Text Metadata | Image Metadata | Video Metadata | Audio Metadata |
|---|---|---|---|---|---|
| 001 | Laptop Computer | title001, description001.txt | Image001, image101.png | Video001.mov | audiofile001.wav |
| 002 | Handbag | title002, description002.txt | Image002, image202.png | Video002.mov | audiofile002.wav |
| 003 | Computer | title003, description003.txt | Image003, image303.png | Video003.mov | audiofile003.wav |

FIG. 13

SYSTEMS, METHOD, AND NON-TRANSITORY COMPUTER-READABLE STORAGE MEDIA FOR MULTI-MODAL PRODUCT CLASSIFICATION

FIELD OF THE DISCLOSURE

U.S. Patent Classification Primary Class: 707 (DATA PROCESSING: DATABASE, DATA MINING, AND FILE MANAGEMENT OR DATA STRUCTURES. Art Unit: 2161.

The present invention relates to classification models for use in assigning labels to items, and more particularly, to systems, methods, and computer-readable storage media that include Multi-modal product classification networks.

BACKGROUND

Many consumers desire to order items or goods remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria.

Product classification is a key issue in e-commerce domains. A product is typically represented by metadata such as its title, image, color, weight and so on, and most of the product metadata is assigned manually by the seller. Once a product is uploaded to an e-commerce website, it is typically placed in multiple categories, in order to provide better user experience, efficient search, and assist computer recommendation systems. A few examples of categories are internal taxonomies (for business needs), public taxonomies (such as groceries and office equipment) and a product's shelf (a group of products that are presented together on an e-commerce web page). These categories vary with time in order to optimize search efficiency and to account for special events such as holidays, and big sport events. In order to address these needs, known e-commerce websites typically require human editors and/or human crowd sourcing platforms to classify products. However, due to the high amount of new products uploaded daily and the dynamic nature of the categories, machine learning solutions for product classification are very appealing as a mean to reduce time and economic costs of using human editors to assign product categories. Thus, precisely categorizing items emerges as a significant issue in e-commerce domains.

The present invention is aimed at one or more of the problems identified above.

SUMMARY OF THE INVENTION

In different embodiments of the present invention, systems, methods, and computer-readable storage media implement a multi-modal computer classification network system to assign classification labels.

In one embodiment of the present invention, a multi-modal computer classification network system for use in classifying data records is provided. The system includes a memory device, a first classification computer server, a second classification computer server, and a policy computer server. The memory device includes an item records database and a labeling database. The item records database includes a plurality of item records. Each item record includes an item ID, a first classification metadata set, and a second classification metadata set. The labeling database includes a plurality of labeling records. Each labeling record includes a class label and labeling data. The first classification computer server includes a first classifier program that is configured to select an item record from the item database and generate a first classification record including a first ranked list of class labels. The first ranked list of class labels is generated using input data including the labeling records and the first classification metadata set included in the selected item record. The second classification computer server includes a second classifier program that is configured to generate a second classification record including a second ranked list of class labels. The second ranked list of class labels is generated using input data including the labeling records and the second classification metadata set included in the selected item record. The policy computer server includes a policy network that is programmed to determine a predicted class label based on the first and second ranked lists of class labels and generate a labeled item record including the item ID included in the selected item record and the predicted class label.

In another embodiment of the present invention, one or more non-transitory computer-readable storage media, having computer-executable instructions embodied thereon are provided. When executed by at least one processor, the computer-executable instructions cause the processor to function as a multi-modal computer classification network system that includes a first classification computer server, a second classification computer server, and a policy computer server. The first classification computer server includes a first classifier program that is configured to access a memory device that includes an item records database and a labeling database. The item records database includes a plurality of item records. Each item record includes an item ID, a first classification metadata set, and a second classification metadata set. The labeling database includes a plurality of labeling records. Each labeling record includes a class label and labeling data. The first classifier program also selects an item record from the item database and generate a first classification record including a first ranked list of class labels. The first ranked list of class labels is generated using input data including the labeling records and the first classification metadata set included in the selected item record. The second classification computer server includes a second classifier program that is configured to generate a second classification record including a second ranked list of class labels. The second ranked list of class labels is generated using input data including the labeling records and the second classification metadata set included in the selected item record. The policy computer server includes a policy network that is programmed to determine a predicted class label based on the first and second ranked lists of class labels and generate a labeled item record including the item ID included in the selected item record and the predicted class label.

In yet another embodiment of the present invention, a method for operating multi-modal computer classification network system for classifying product data records is provided. The method includes a memory device generating and storing an item records database and a labeling database. The item records database includes a plurality of item records. Each item record includes an item ID, a first classification metadata set, and a second classification metadata set. The labeling database includes a plurality of labeling records. Each labeling record includes a class label and labeling data. The method includes a first classification computer server including a first classifier program selecting an item record from the item database and generating a first classification record including a first ranked list of class labels. The first ranked list of class labels is generated using input data including the labeling records and the first classification metadata set included in the selected item record. The method also includes a second classification computer server including a second classifier program generating a second classification record including a second ranked list of class labels. The second ranked list of class labels is generated using input data including the labeling records and the second classification metadata set included in the selected item record. The method also includes a policy computer server including a policy network determining a predicted class label based on the first and second ranked lists of class labels and generating a labeled item record including the item ID included in the selected item record and the predicted class label.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 8-13 are illustrations of exemplary database records generated by the system shown in FIGS. 1-3, according to embodiments of the present invention.

Figure 1:
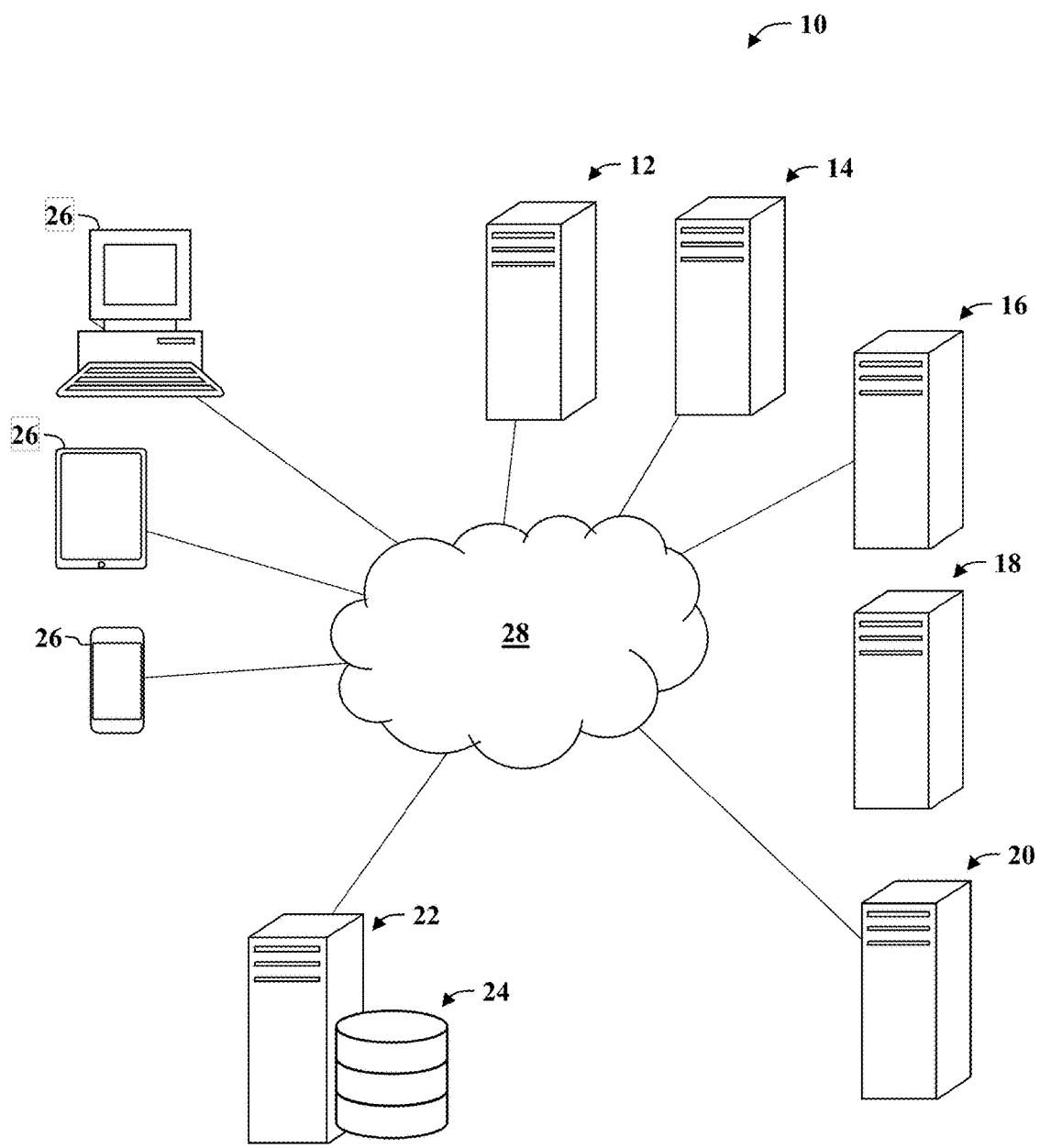
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the present invention describes a computer network system 10 that includes a multi-modal item classification system that may be used to assign class labels to item records. In one embodiment, the multi-modal item classification system may be used with an ecommerce web-based system. In other embodiment, the multi-modal item classification system may be used with any suitable data set that requires classification.

Classifying products into categories precisely and efficiently is a major challenge in modern ecommerce. The high traffic of new products uploaded daily and the dynamic nature of the categories raise the need for machine learning models that can reduce the cost and time of human editors. In one embodiment, the system 10 implements a decision level fusion approach for multi-modal product classification using text and image inputs. The system 10 trains input specific state of the art deep neural networks for each input source, forges the neural networks together into a single multimodal architecture, and trains a novel policy network that learns to choose between them. Finally, the system 10 includes a multi-modal network that improves the top-1 accuracy % over both networks on a real world large scale product classification data set.

Shelf are group of products presented together on an ecommerce website page, and usually contain products with a given theme/category (e.g., Women boots, folding tables). Product to shelf classification presents multiple challenges for machine learning algorithms. First, it is typically a multi-class problem with thousands of classes. Second, a product may belong to multiple shelves making it a multi-label problem. Third, the labels may contain some noise since some of them are collected by crowds. And last, a product has both an image and a text input making it a multi-modal problem.

Products classification is typically addressed as a text classification problem because most metadata of items are represented as textual features. Text classification is a classic topic for natural language processing, in which one needs to assign predefined categories to text inputs. Standard methods follow a classical two stage scheme of extraction of (handcrafted) features, followed by a classification stage. Typical features include bag-of-words or n-grams, and their TF-IDF. On the other hand, Deep Neural Networks use generic priors instead of specific domain knowledge, and have been shown to give competitive results on text classification tasks. In particular, Convolutional neural networks (CNNs) and Recurrent neural networks (RNNs) can efficiently capture the sequentially of the text. These methods are typically applied directly to distributed embedding of words or characters, without any knowledge on the syntactic or semantic structures of a language.

Designing a multi modal architecture is very tricky. Each data type typically has a different state of the art architecture, that varies in depth, width and optimization algorithm. Moreover, a fully differential multi modal architecture potentially has more local minima that may give unsatisfying results. Also, most of the publicly available benchmarks for classification which are big enough to train deep learning architectures typically contain only one data type.

Nevertheless, the potential performance boost of multi-modal architectures has motivated researchers lately. For example, some researches have combined an image network with a Skip-gram Language Model in order to improve classification results on ImageNet. However, they were not able to improve the top-1 accuracy prediction, possibly because the text input they used (image labels) didn't contain a lot of information. Other works, used multi-modality to learn good embedding, but did not present results on classification benchmarks.

In addition, some research has suggested a method to improve the product classification from text using images by learning a decision rule. However, they only experienced with a small data set and low number of labels, and it is not clear how to scale their method for extreme multi-class multi-label applications that characterize real world problems in e-commerce.

Figure 10:
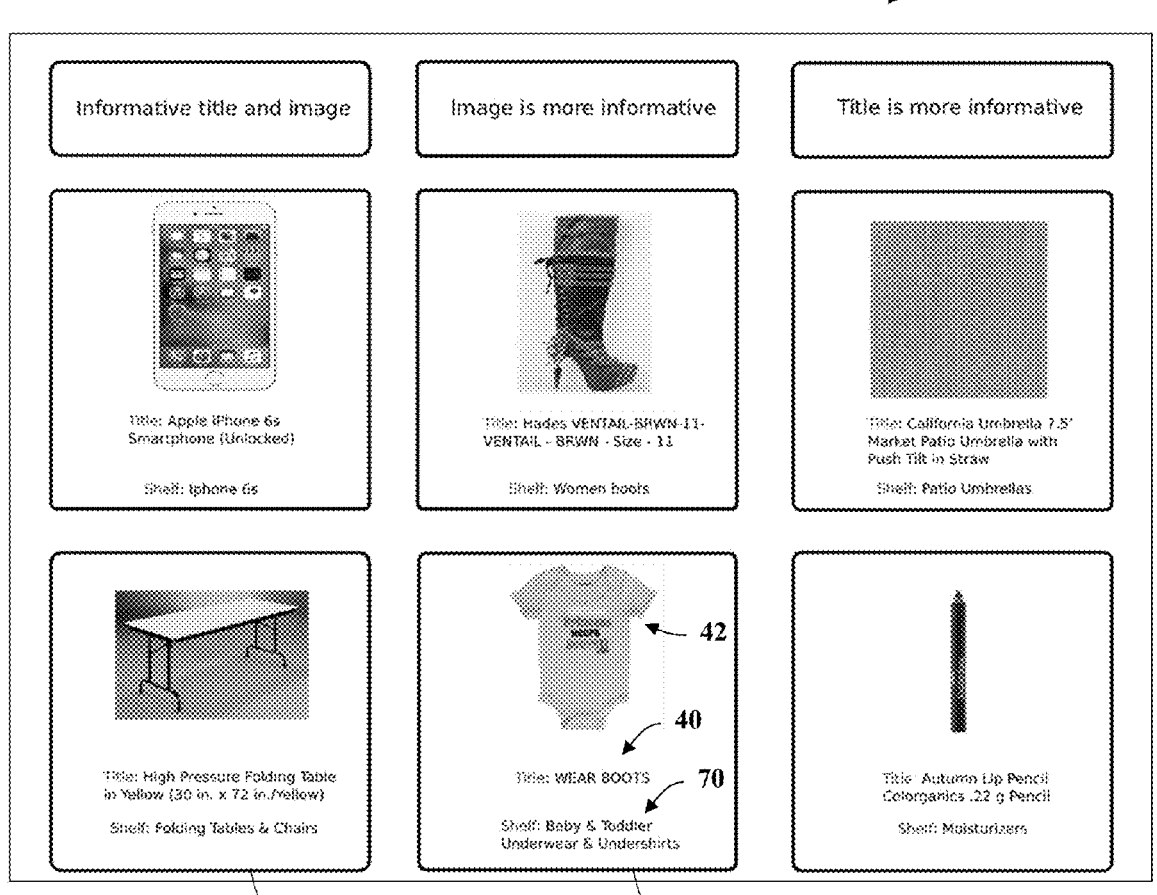

In the illustrated embodiment, the system 10 collected a large-scale data set of 1:2 million products from the Walmart.com website. Each product has a title and an image, and needs to be classified to a shelf (label) with 2890 possible class labels, e.g. shelves. Examples from this data set can be seen in FIG. 10, which illustrates predicted shelves from product metadata obtained from Walmart.com. As shown in FIG. 10, the products that have both an image and a title that contain useful information for predicting the product's shelf. For example, referring to the record orientated at the center, top position: the boots title is giving specific information about the boots but not mentioning that the product is a boot, making it harder to predict the shelf. Referring to the record orientated at the center, bottom position: the baby toddler's title is only referring to the text on the toddler and not mentioning that it is a product for babies. Referring to the record orientated at the right, top position: the umbrella image is containing information about its color but it is hard to understand that the image is referring to an umbrella. Referring to the record orientated at the right, bottom position: the lip pencil image is looking like a regular pencil, making it hard to predict that it belongs to the moisturizers shelf.

For most of the products, both the image and the title of each product contain relevant information for customers.

However, it is interesting to observe that for some of the products, both input types may not be informative for shelf prediction (FIG. 10). This observation motivates the works and raises interesting questions: which input type is more useful for product classification? Is it possible to forge the inputs into a better architecture?

Figure 3:
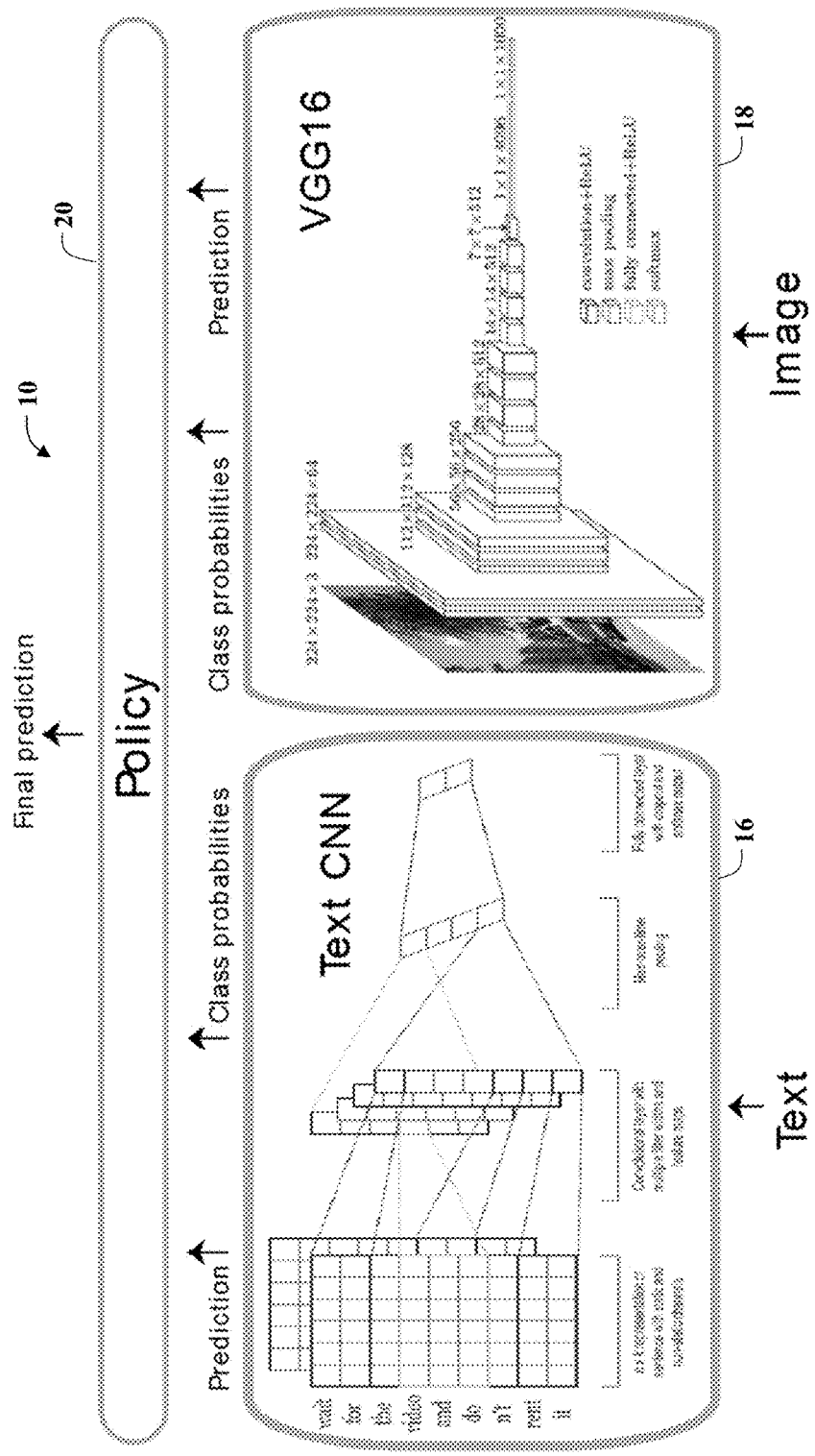
FIG. 3 is a block diagram illustrating example components of the system shown in FIG. 1, according to an embodiment of the present invention.

In the illustrated embodiment, the system 10 is designed to leverage the specific priors for each data type by using the current state of the art classifiers from the image and text domains. In one embodiment, the classification system architecture has 3 main components (shown in FIG. 3, illustrating a multi modal architecture for product classification): a text CNN, an image CNN and a policy network that learns to choose between them. In operation, the text CNN outperforms the image one. However, for a relative big amount of the products (~8%), the image CNN is correct while the text CNN is wrong, indicating a potential gain from using a multi-modal architecture. The policy network is able to choose between the two models and give a performance improvement over both state of the art networks. This is the first architecture that demonstrates performance boost over state of the art methods on a large scale data set by combining text and image inputs. In particular, the main contributions are: 1) the system demonstrates that the text classification CNN may outperform a VGG network on a real world large scale product to shelf classification problem; 2). The system analyzes the errors made by the different networks and shows the potential gain of multi-modality; and 3) the system includes a novel decision-level fusion policy that learns to choose between the text and image networks and improve over both.

In one embodiment, the system 10 includes a multi modal product classification architecture. The architecture is composed of a text CNN and an image CNN which are forged together by a policy network, as can be seen in FIG. 3.

Multi label cost function: the multi-label nature of the problem by using a weighted sigmoid cross entropy with logits cost function. Let x be the logits (output of the network last layer), z be the targets, q be a positive weight coefficient, used as a multiplier for the positive targets, and $$\sigma(x) = \frac{1}{1+\exp(-x)} \quad \text{Equation 1}$$

The loss is given by:

$$\text{Cost}(x,z;q) = -qz \cdot \log(\sigma(x)) - (1-z) \cdot \log(1-\sigma(x)) = (1-z) \cdot x + (1+(q-1) \cdot z) \cdot \log(1+\exp(-x)). \quad \text{Equation 2}$$

The positive coefficient q; allows one to trade off recall and precision by up- or down-weighting the cost of a positive error relative to a negative error and is to have a significant effect in practice.

Text classification: In one embodiment, the system 10 may include a text CNN architecture. The first layer embeds words into low-dimensional vectors using random embedding. The next layer performs convolutions over time on the embedded word vectors using multiple filter sizes (3, 4, and 5), and use 128 filters from each size. Next, the text CNN will max-pool-over-time the result of each convolution filter and concat all the results together. The system adds a dropout regularization layer (0.5 dropping rate), followed by a fully connected layer, and classify the result using a softmax layer. An illustration of the Text CNN can be seen in FIGS. 3 and 5.

Image classification: In one embodiment, the system 10 may include a VGG network. The input to the VGG Network is a fixed-size 224×224 RGB image. The image is passed through a stack of convolutional layers with a very small receptive field: 3×3. The convolution stride is fixed to 1 pixel; the spatial padding of convolutional layer is 1 pixel. Spatial pooling is carried out by five maxpooling layers, which follow some of the convolutional layers. Max-pooling is performed over a 2×2 pixel window, with stride 2. A stack of convolutional layers is followed by three Fully-Connected (FC) layers: the first two have 4096 channels each, the third performs 2089-way product classification and thus contains 2089 channels (one for each class). All hidden layers are followed by a ReLu nonlinearity. The details can be seen in FIGS. 3 and 6.

Multi modal architecture: In one embodiment, the system 10 includes two main unification techniques for multi-modal architectures: feature-level fusion and decision-level fusion. Typically, feature level fusion is done by concatenating the feature vectors (e.g., the neural network's last hidden layer) of the different modalities, to form a single long feature vector. This is typically followed by a model that learns to classify from this concatenated features vector. While these methods have showed potential to boost performance on small data sets, or on top-k accuracy measures, these may not succeed with applying it on a large scale data set and received performance improvement on the top-1 accuracy measure.

The goal of decision-level fusion is to learn a decision rule between the input specific classifiers. The decision rule is typically a pre-defined rule and is not learned from the data. For example, some known architectures chose the model with the maximal confidence, or average models predictions. However, the system 10 of the present invention learns the decision rule to outperform all other known architectures.

In one embodiment, the system 10 may include four different types of architectures. (1) Policies that learn from the text and image CNNs class probability inputs (shown in FIG. 3). For these policies architectures with one or two fully connected layers may be used, where the two-layered policy is using 10 hidden units and a ReLu non-linearity. (2) Policies that learn from the text and image inputs, for example an additional CNN as the policy network, either the text CNN or the VGG network. (3) Predefined policies, that either average the model predictions or choose the maximal confidence model. And (4), feature level-fusion, that concatenate the last hidden layer of each network followed by one to three fully connected layers. In order to train the polices (configurations 1 and 2), the labels are collected from the image and text networks predictions, i.e., the label is 1 if the image network made a correct prediction while the text network made a mistake, and 0 otherwise. On evaluation, the policy predictions are used to select between the models, i.e., if the policy prediction is 1 the image network is used, and the text network otherwise.

In general, products need to be classified against many different taxonomies such as, Shelf, Product type, Rhid. The quality of the classification impacts: User experience, Search quality, Matching, and more. Currently, classification is too expensive and time consuming to be done by human editors/crowd, and machine learning (ML) may be used to classify products.

The present invention improves ML model accuracy. Current model uses text only such as, Title, Description, and/or Attribute/values. However, other data is available for the product such as, for example, images, and Product reviews.

The present invention includes a new classification architecture to blend together signal from multiple sources for classification (multi-modal). Experiments show improved accuracy for shelf classification. The system can be extended to more than 2 signals includes, but not limited to, Text, Image, Video, etc., and leverages state of the art single mode classifiers for each of the "signals". The system can be extended to other multi-modal problems including: Attribute extraction and Demand estimation.

In one embodiment, the system includes a policy implemented with a neural network. The Policy is trained from labeled data and input to policy network can include class probabilities from each network such as text/image features. The system includes a novel architecture that can be used for other multi-modal problems and not just classification, such as for example, regression.

The system may be configured to use over 2900 classes, using text classifiers and image classifiers. Image classifier may be 9% less accurate than text, however, error analysis shows a hypothetical gain on fusing text with image to be >8%. The multi-modal scheme boosts performance by +1.6% points, with the Policy implemented with shallow network with one hidden layer with 10 units. For example, using one hidden layer with 10 units (non linearity helps), most of the signal is in the top-3 class probabilities from models.

The system may be configured to be used anywhere there is a multi-modal problem such as, for example, problems involving products including Demand estimation, Classification, Attribute extraction, and/or Add to cart estimation.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a multi-modal computer classification network system for use in classifying product data records. The system 10 includes a website hosting server 12, a search engine server 14, a first classification server 16, a second classification server 18, a policy network server 20, a database server 22, a database 24, and one or more user computing devices 26 that are each coupled in communication via a communications network 28. The communications network 28 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed. Each server may include a server computer that includes a processing device that includes a processor that is coupled to a memory device. The processing device executes various programs, and thereby controls components of the server according to user instructions received from the user computing devices and/or other servers. The processing device may include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device may also include a memory device for storing programs and information in the database 24, and retrieving information from the database 24 that is used by the processor to perform various functions described herein. The memory device may include, but is not limited to, a hard disc drive, an optical disc drive, and/or a flash memory drive. Further, the memory device may be distributed and located at multiple locations.

In the illustrated embodiment, the first classification server 16 includes a first classifier program that is configured to generate a ranked list of class labels for item records that are selected from the database 24. For example, in one embodiment, the first classifier program is configured to select an item record from an item database, access the item metadata included in the selected item record, access a trusted labeling database included trusted labeling records and retrieve class labels and corresponding labeling data included in the trusted labeling records, and generate a ranked list of class labels based on the item metadata and the trusted labeling records. In addition, the first classifier program may also generate a classification probability for each class label in the ranked list of class labels. The classification probability indicating the probability of the corresponding class label being a correct class label, that may be determined based on the item metadata and the trusted labeling records. The first classifier program may also generate a classification record that may be used by the policy network to determine a predicted class label for the selected item record. The first classifier program may also generate the ranked list of class labels based on the corresponding class probabilities with the class labels ranked from highest to lowest classification probability.

For example, in one embodiment, the first classification server 16 may include a single-mode text CNN classifier that is programmed to select an item record from an item records database and generate a first classification record including a first ranked list of class labels and a first classification probability associated with each class label included in the first ranked list of class labels using input data including a text classification metadata set included in the selected item record and the plurality of labeling records. The text CNN may also be trained using the trusted labeling records.

The second classification server 18 includes a second classifier program that is also configured to generate a ranked list of class labels from the selected item record and the trusted label records. In the illustrated embodiment, the second classifier program uses input data that is different than the input data used by the first classifier program. For example, in one embodiment, the first classifier program may access the selected item record to retrieve input data including a first classification metadata set included in the selected item record. The second classifier program may access the selected item record to retrieve input data including a second classification metadata set that is different from the first classification metadata set.

For example, in one embodiment, the second classifier program may include a single-mode image CNN classifier that is programmed to retrieve input data including an image classification metadata set included in the selected item record. The second classifier program may then generate a second classification record that includes a second ranked list of class labels using input data including the trusted labeling records and the image classification metadata set included in the selected item record. In addition, the second classifier program may also generate a second classification probability for each class label in the second ranked list of class labels. The second classifier program may also generate the second ranked list of class labels based on the corresponding class probabilities with the class labels ranked from highest to lowest classification probability. For example, the second classifier program may generate the second ranked list of class labels having a different ranked order of class labels than the ranked order included in the first ranked list of class labels generated by the first classifier program based on text metadata. In one embodiment, the image CNN may be a VGG™ network. In addition, the image CNN classifier may also be trained using the trusted labeling records. The second classification record may be generated using the second classification metadata set that is different from the first classification metadata set. For example, in one embodiment, the first classification metadata set may include text data and the second classification metadata set may include image data. In another embodiment, the second classification metadata set may include video data. Additionally, the classification metadata used by the first classification server 16 and/or the second classification server 18 may include text data, image data, video data, audio data, and/or any suitable data that may be used by a classification computer program to generate predicted class labels and classification probabilities.

The policy network server 20 includes a policy network that is programmed to generate a labeled item record using input data that includes the output data from the first classification server 16 and the second classification server 18. For example, the policy network server 20 may include a policy network that is programmed to use input data including the first classification record and the second classification record and determine a predicted class label based on the first and second ranked lists of class labels and generate a labeled item record that includes the predicted class label. In addition, the policy network may be programmed to determine the predicted class label based on the first and second ranked lists of class labels and the corresponding first and second classification probabilities. In one embodiment, the policy network may include a CNN. In another embodiment, the system 10 may include one or more policy networks that include a plurality of policy programs including, but not limited to, CNN, a logistic regression, a Support Vector Machine (SVM), a Generic Neural Network, and/or a Random Forest classifier. In addition, the system 10 may also include a plurality of classifier programs including, but not limited to, CNN, a logistic regression, a SVM, a Generic Neural Network, and/or a Random Forest classifier, that may provide input data to the policy networks. In addition, the policy network may be trained from the classification probabilities of the first and second classifier programs.

The user computing device 26 may include any suitable device that enables a user to access and communicate with the system 10 including sending and/or receiving information to and from the system 10 and displaying information received from the system 10 to a user. For example, in one embodiment, the user computing device 26 may include, but is not limited to, a desktop computer, a laptop or notebook computer, a tablet computer, smartphone/tablet computer hybrid, a personal data assistant, a handheld mobile device including a cellular telephone, and the like.

The database server 22 includes a memory device that is connected to the database 24 to retrieve and store information contained in the database 24. The database 24 contains information on a variety of matters, such as, for example, web pages associated with one or more websites, search queries, customer account information, item records, product images, product information, item records, item description information, classification metadata including, but not limited to, text data, image data, audio data, and video data, class labels, labeling data, product classification data, and/or any suitable information that enables the system 10 to function as described herein. The data and/or records contained in the database 24 may include searchable data terms including characters, symbols, letters, numbers, words, phrases, images, text data files, video data files, image data files, audio data files, and the like.

For example, in one embodiment, the database 24 may contain an item records database 30 (shown in FIG. 8) that includes a plurality of item records 32. In one embodiment, the item records 32 include information that is associated with a plurality of products 34 (shown in FIG. 7) that may be displayed on a website. In another embodiment, the item records 32 may include any suitable collection of related data sets such as, for example, records of consumer products, population data, weather data, and/or any data sets that are suitable for statistical analysis. In one embodiment, each item record 32 may include an item ID 36 and item metadata 38 including data associated with a corresponding item such as, for example, a corresponding product 34. For example, the item metadata may include product titles and/or product descriptions associated with the product and may include numerical values, image files, video files, audio files, and/or text data that includes information used to describe the product 34.

In the one embodiment, the item metadata 38 may include text metadata 40, image metadata 42, video metadata 44, audio metadata 46, and/or any suitable information that may be associated with a product and/or item. For example, the text metadata 40 may include text associated with a product title and/or product description. The image metadata 42 may include image files and/or images associated with a product and/or item. The video metadata 44 may include video data files that include video images and/or video movies that are associated with a product and/or item, and the audio metadata 46 may include audio data files that includes sounds that may be associated with a product and/or item.

Each of the item records 32 are configured to be used by one or more classification program models to generate predicted labels and/or predicted product category labels for the products associated with the corresponding item records 32. For example, in one embodiment, each item record 32 may include a first classification metadata set, such as, for example text metadata 40, and a second classification metadata set such as, for example, image metadata 42. The text metadata 40 may be used by the first classification server 16 to generate a first ranked list of class labels and first classification probabilities associated with each of the class labels. Similarly, the image metadata 42 may be used by the second classification server 18 to generate a second ranked list of class labels and second classification probabilities associated with each of the class labels.

Figure 11:
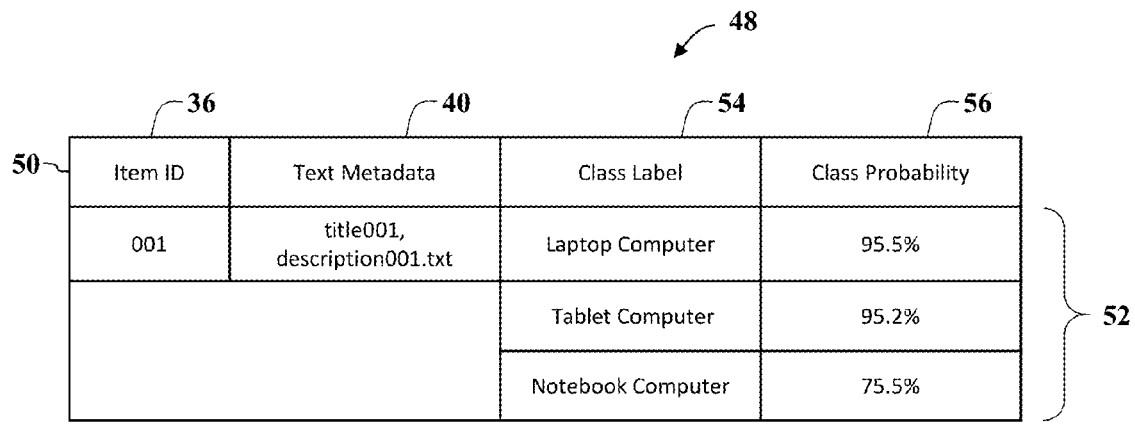

In one embodiment, the database 24 may include a first classification database 48 (as shown in FIG. 11) that includes a plurality of first classification records 50 being generated by the first classification server 16. The first classification records 50 may also include information associated with a classification model operation being used by the first classification server 16 to assign classification labels to each of the item records 32. For example, in one embodiment, the first classification server 16 may include a text CNN classifier that is programmed to generate a text classification record 50 from the text metadata 40 included in a selected item record 32 and store the text classification record 50 in a text classification database 48. In the illustrated embodiment, each text classification record 50 includes the item ID 36 associated with the corresponding selected item record 32, a first ranked list 52 of class labels 54 generated by the text CNN classifier, and a first classification probability 56 associated with each of the class labels 54 generated by the text CNN classifier. Each class label 54 may include information associated with the corresponding product category. The first classification probability 56 may indicate the probability of the corresponding class label 54 being the correct class label. In one embodiment, the text classification record 50 may also include the text metadata 40 included in the corresponding selected item record 32.

Figure 12:
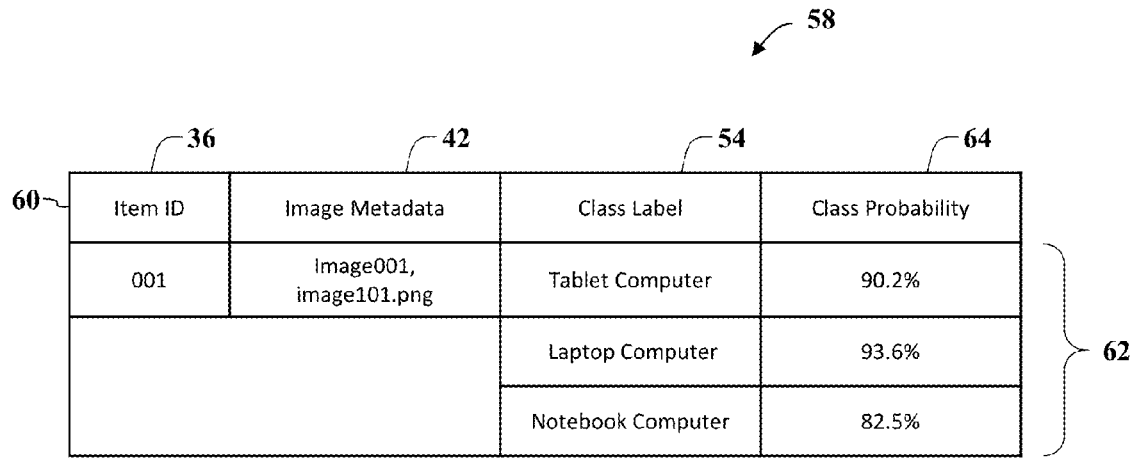

The database 24 may also include a second classification database 58 (as shown in FIG. 12) that includes a plurality of second classification records 60 being generated by the second classification server 18. The second classification records 60 may also include information associated with a classification program model operation that is different than the classification program model being used by the first classification server 16 and is being conducted to generate a ranked list of class labels for each of the item records 32. For example, in one embodiment, the second classification server 18 may include a image CNN classifier that is programmed to generate an image classification record 60 from the image metadata 42 included in a selected item record 32 and store the image classification record 60 in an image classification database 58. In the illustrated embodiment, each image classification record 60 includes the item ID 36 associated with the corresponding selected item record 32, a second ranked list 62 of class labels 54 generated by the image CNN classifier, and a second classification probability 64 associated with each class label 54 and generated by the image CNN classifier. In one embodiment, the image classification record 60 may also include the image metadata 42 included in the corresponding selected item record 32.

In one embodiment, the database 24 may contain a labeled item database 66 (shown in FIGS. 10 and 13) that includes a plurality of labeled item records 68 being generated by the policy network server 20. For example, each labeled item record 68 may be associated with a corresponding product 34 that may be displayed via a website. In the illustrated embodiment, each labeled item record 68 includes an item ID 36, a predicted class label 70 indicating a product category, and item metadata 38 including data associated with the corresponding product 34. The labeled item records 68 may also include information associated with a classification model operation being conducted to assign classification labels using a first classification record 50 and a second classification record 60 as input into a policy network. For example, in the illustrated embodiment, the policy network server 20 includes a policy network that receives the first and second classification records associated with a selected item record 32, and selects a predicted class label 70 based on the first ranked list 52 and the second ranked list 62 of class labels 54. The policy network server 20 then generates a labeled item record 68 that is associated with the selected item record 32 and includes the item ID included in the selected item record 32, the predicted class label 70 selected based on the first and second ranked lists of class labels 54, and the item metadata 38 included in the selected item record 32. The policy network server 20 stores the labeled item records 68 in the labeled item database 66 that may be accessed by the search engine server 14 and/or the website hosting server 12 for use in generated webpages that display products in response to search requests received from users using the website to search and display product information.

For example, in one embodiment, the labeled item records 68 include predicted class labels 70 that include classification information association with consumer product information that may be used to retrieve and display the item records on a website. For example, the classification information may include predefined categories of consumer products (e.g. electronics, sporting goods, houseware, etc.) that are used to group labeled item records 68 having one or more similar product attributes to facilitate consumer product search queries performed by the search engine server 14. In another embodiment, the class labels 54 may include any suitable information that may associated and/or assigned to the labeled item records 68.

In one embodiment, the database may also include a trusted labeling database 72 (shown in FIG. 9) that includes a plurality of labeling records 74. Each labeling record 74 includes a class label 54 and corresponding labeling data 76 that may be used to train the classification models. For example, the labeling data 76 may include text definition data 78, images definition data 80, video, and/or audio data that is associated with a corresponding class label 54 that may be used by classification models to predict and/or assign class labels to labeled item records 68. For example, the labeling data 76 may be used to train the text CNN, the image CNN, and/or the policy network. In one embodiment, the text CNN classifier may select an item record 32 and retrieve the text metadata 40, and generate a first classification probability 56 for each class label 54 included in the included in the trusted labeling database 72. The text CNN classifier may then generate the first ranked list 52 of class labels 54 based on the corresponding first classification probabilities. Similarly, the image CNN classifier may retrieve the image metadata 42 from the selected item record 32, access the trusted labeling database 72 and generate a second classification probability 64 for each class label 54 included in the trusted labeling database 72, and generate the second ranked list 62 of class labels 54 based on the corresponding second classification probabilities.

The website hosting server 12 is programmed to host a website 82 (shown in FIG. 7) that is accessible by a user via one or more user computing devices 26. The website hosting server 12 retrieves and stores web pages associated with one or more websites 82 in response to requests received by the user via the user computing device 26 to allow users to interact with the website and search and/or purchase products such as, for example, goods and/or services via the website. In one embodiment, the website hosting server 12 is configured to generate and display web pages associated with the website in response to requests being received from consumers via corresponding web browsers that are displayed on the user computing devices 26. For example, in one embodiment, the website hosting server 12 may display a product search webpage 84 (shown in FIG. 7) in response to receiving a user request that allows a user to input a product search request 86 including search criteria including one or more search terms.

In one embodiment, the website hosting server 12 may allow customers to login and access corresponding customer accounts including account information such as, for example, previous purchase, pending orders, pending deliveries, and/or product preferences. For example, the website hosting server 12 may display a login page (not shown), receive a unique customer ID such as, for example, a username and/or password, and identify the customer account associated with the unique customer ID to enable the identified customer to access information and/or features associated with the corresponding customer account. In addition, the website hosting server 12 may transmit the product search request to the search engine server 14 for use in generating search data and/or product lists in response to the user's search request. The website hosting server 12 may also receive one or more product lists including labeled item records 68 selected from the labeled item database 66 by the search engine server 14 that includes information associated with products that are selected based on the user's search criteria. The website hosting server 12 may also display a search results webpage 84 to display the products 34 included in the product list to the user and to allow the user to select one or more of the displayed products for purchase.

In the illustrated embodiment, the search engine server 14 is configured to receive a product search request from the website hosting server 12 including one or more search terms, and generate search data including a plurality of item records as a function of the search terms. For example, in one embodiment, the search engine server 14 may initiate a search algorithm based on a Boolean model to search the labeled of labeled item records 68 included in the labeled item database 66 (shown in FIGS. 10 and 13) based search terms received from the user. The search engine server 14 may determine one or more desired product categories based on the received product search request and access the labeled item database 66 to select labeled item records 68 having predicted class labels matching the desired product categories. In one embodiment, the search engine server 14 may also generate a relevance score associated with each selected labeled item record 68 that may be used to display the corresponding products in a ranked order. In one embodiment, the relevance score may be determined based on statistical information, including, but not limited to the number of labeled item records 68 included in the labeled item database 66, the frequency in which the search terms appear in the labeled item database 66, and the frequency in which the search term appears in corresponding labeled item record 68. The relevance of a returned search record may be determined based on the corresponding relevance score and the relevance scores of the other selected labeled item records, wherein labeled item records 68 having a higher relevance scores are more relevant to the search criteria. Many variations to the above described method of determining a relevance score associated with a search request fall within the scope of the present invention.

The search engine server 14 generates a product list as a function of the relevance scores associated with each labeled item record 68 and transmits the product lists to the website hosting server 12 for use in displaying the corresponding products 34 to the user via one or more search results webpages 84.

Figure 2:
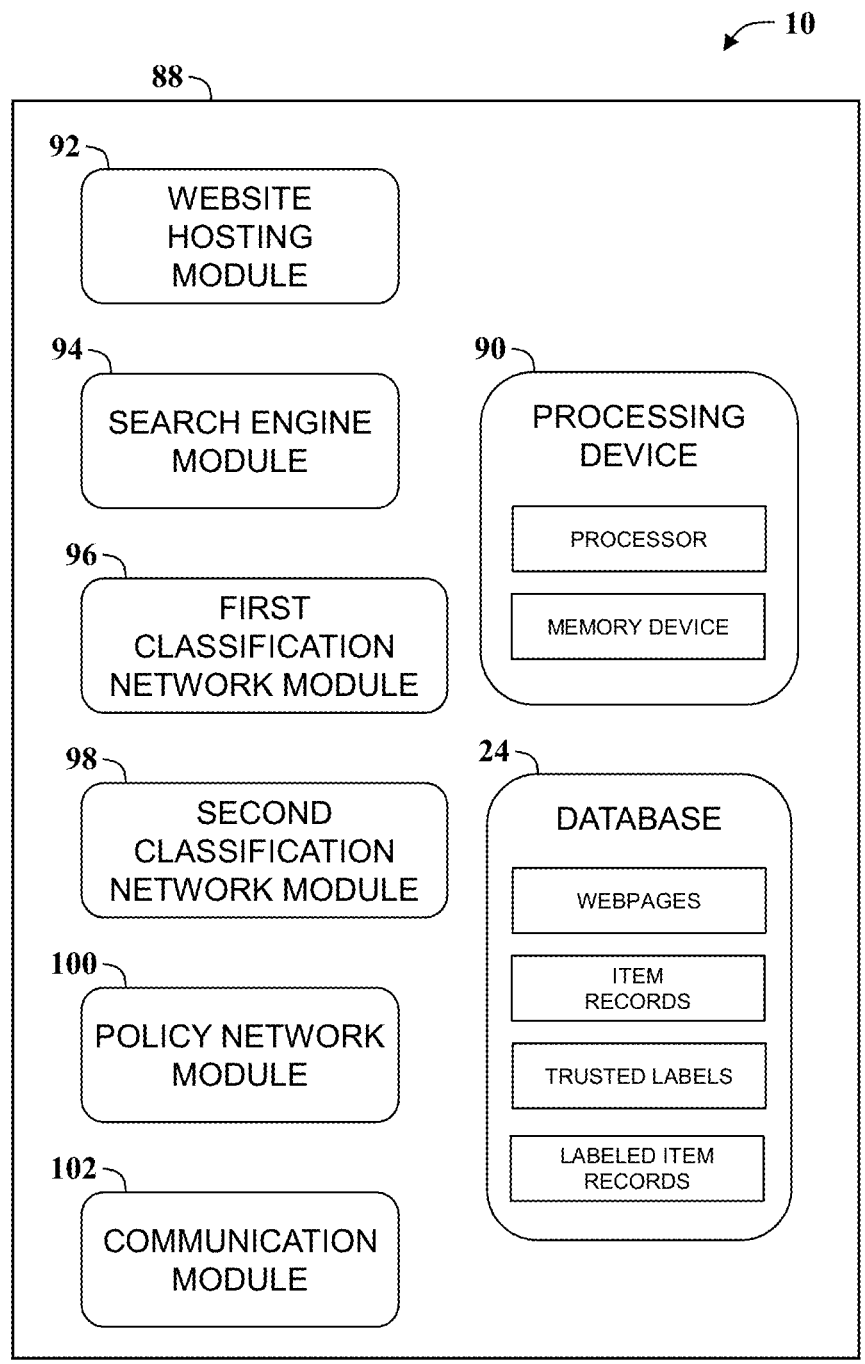
FIG. 2 is a schematic illustrating example components of a server computer that may be used with the system shown in FIG. 1, according to an embodiment of the present invention.

Referring to FIG. 2, in one embodiment, the system 10 may include a system server 88 that is configured to perform the functions of the web site hosting server 12, the search engine server 14, the first classification server 16, the second classification server 18, the policy network server 20, and/or the database server 22. In the illustrated embodiment, the system server 88 includes a processing device 90 and the database 24. The processing device executes various programs, and thereby controls components of the system server 88 according to user instructions received from the user computing devices to enable users to interact with an operate the system 10. In the illustrated embodiment, the system server 88 includes a website hosting module 92, a search engine module 94, a first classification network module 96, a second classification network module 98, a policy network module 100, and a communications module 102.

The communications module 102 retrieves various data and information from the database 24 and sends information to the user computing device 26 via the communications network 28 to enable the user to access and interact with the system 10. In one embodiment, the communications module 102 displays various images on a graphical interface of the user computing device 26 preferably by using computer graphics and image data stored in the database 24 including, but not limited to, web pages, item records, sorted groups, product lists, and/or any suitable information and/or images that enable the system 10 to function as described herein.

The website hosting module 92 may be programmed to perform some or all of the functions of the website hosting server 12 including hosting various web pages associated with one or more websites that are stored in the database 24 and that are accessible to the user via the user computing device 26. The website hosting module 92 may be programmed to generate and display web pages associated with a website in response to requests being received from users via corresponding web browsers.

The search engine module 94 may be programmed to perform some or all of the functions of the search engine server 14 including generating and storing search data in response to the user's product search request. In addition, the search engine module 94 may also be programmed to generate a relevance score associated with each of the labeled item records 68 included in the search data.

The first classification network module 96 may be programmed to perform some or all of the functions of the first classification server 16. For example, in one embodiment, the first classification network module 96 may include a single-mode text CNN classifier that is programmed to select an item record 32 from the item records database 30 and generate a first classification record 50 including a first ranked list 52 of class labels 54 and a first classification probability 56 associated with each class label 54 included in the first ranked list 52 of class labels 54 using input data including the text classification metadata set 40 included in the selected item record 32 and the trusted labeling records 74.

The second classification network module 98 may be programmed to perform some or all of the functions of the second classification server 18. For example, in one embodiment, the second classification network module 98 may include a single-mode image CNN classifier that is programmed to retrieve input data including the image classification metadata set 42 included in the selected item record 32. The second classification network module 98 may be programmed to generate a second classification record 60 that includes a second ranked list 62 of class labels 54 using input data including the trusted labeling records 74 and the image classification metadata set 42 included in the selected item record 32.

The policy network module 100 may be programmed to perform some or all of the functions of the policy network server 20. For example, in one embodiment, the policy network module 100 may include a policy network including a CNN that is programmed to use input data including the first classification record 50 and the second classification record 60 and determine a predicted class label 70 based on the first and second ranked lists of class labels 54 and generate a labeled item record 68 that includes the predicted class label 70. In addition, the policy network module 100 may be programmed to determine the predicted class label 70 based on the first and second ranked lists of class labels and the corresponding first and second classification probabilities.

Figure 4:
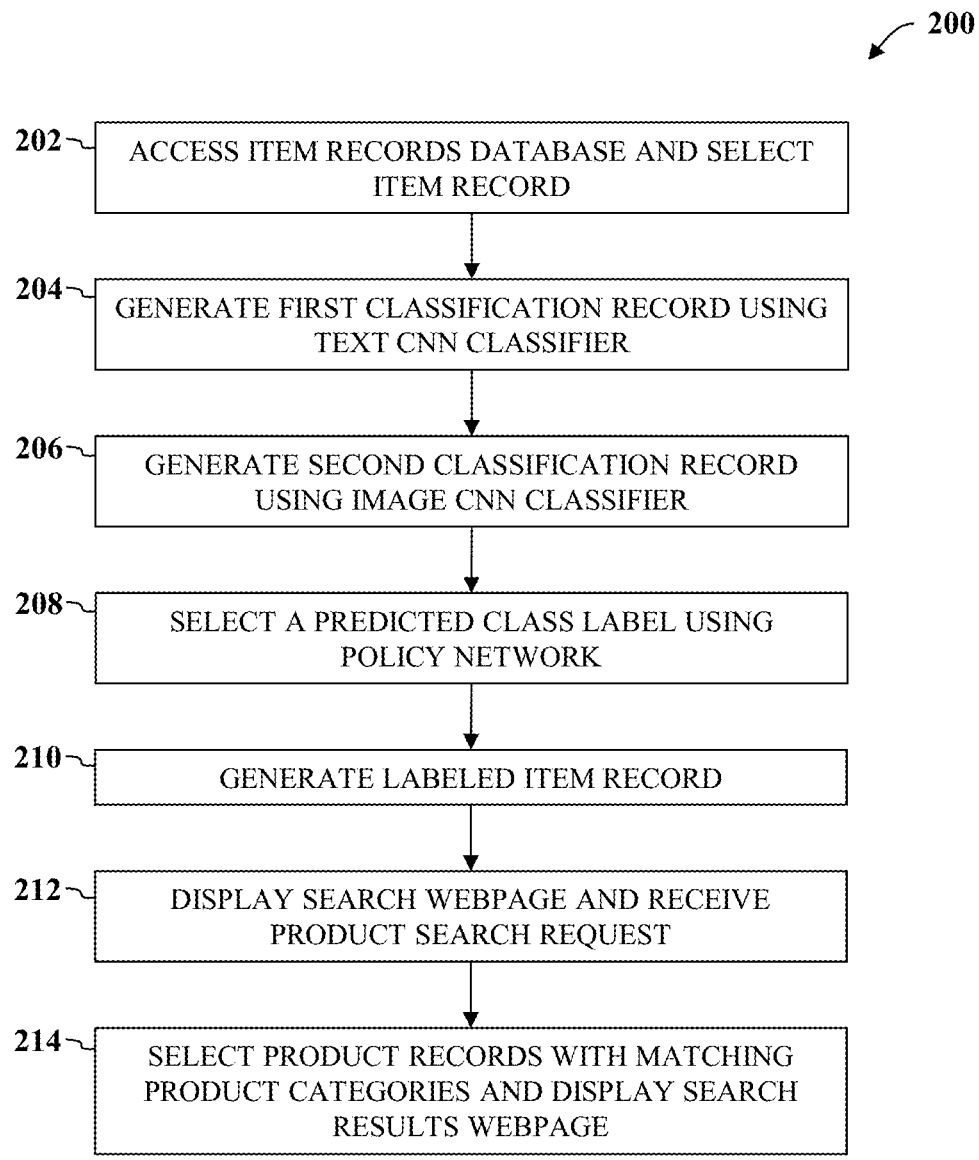
FIG. 4 is a flowchart of a method that may be used with the system shown in FIGS. 1-3, according to an embodiment of the present invention.
Figure 5:
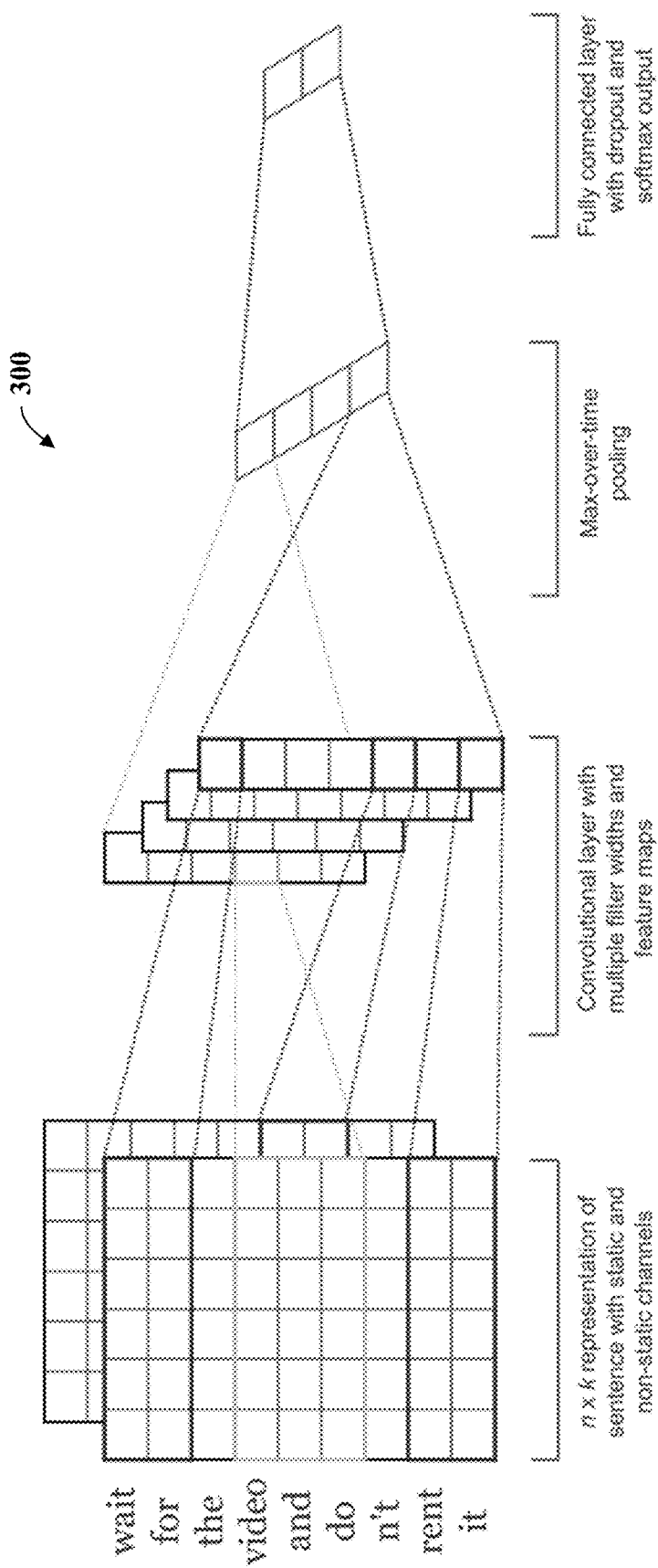
FIG. 5 is a flowchart of a classification method that may be used with the system shown in FIGS. 1-3, according to an embodiment of the present invention.
Figure 6:
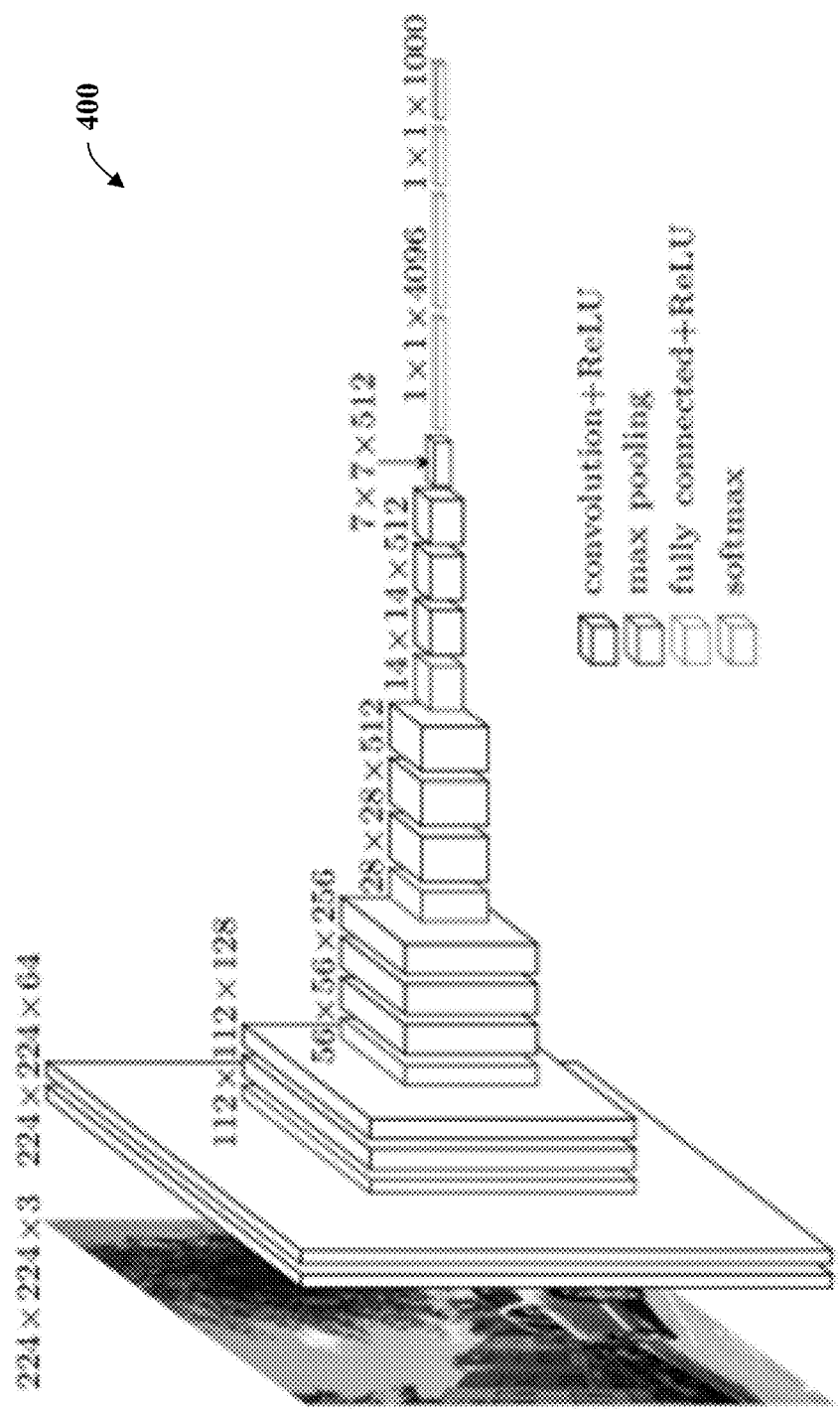
FIG. 6 is a flowchart of another classification method that may be used with the system shown in FIGS. 1-3, according to an embodiment of the present invention.
Figure 7:
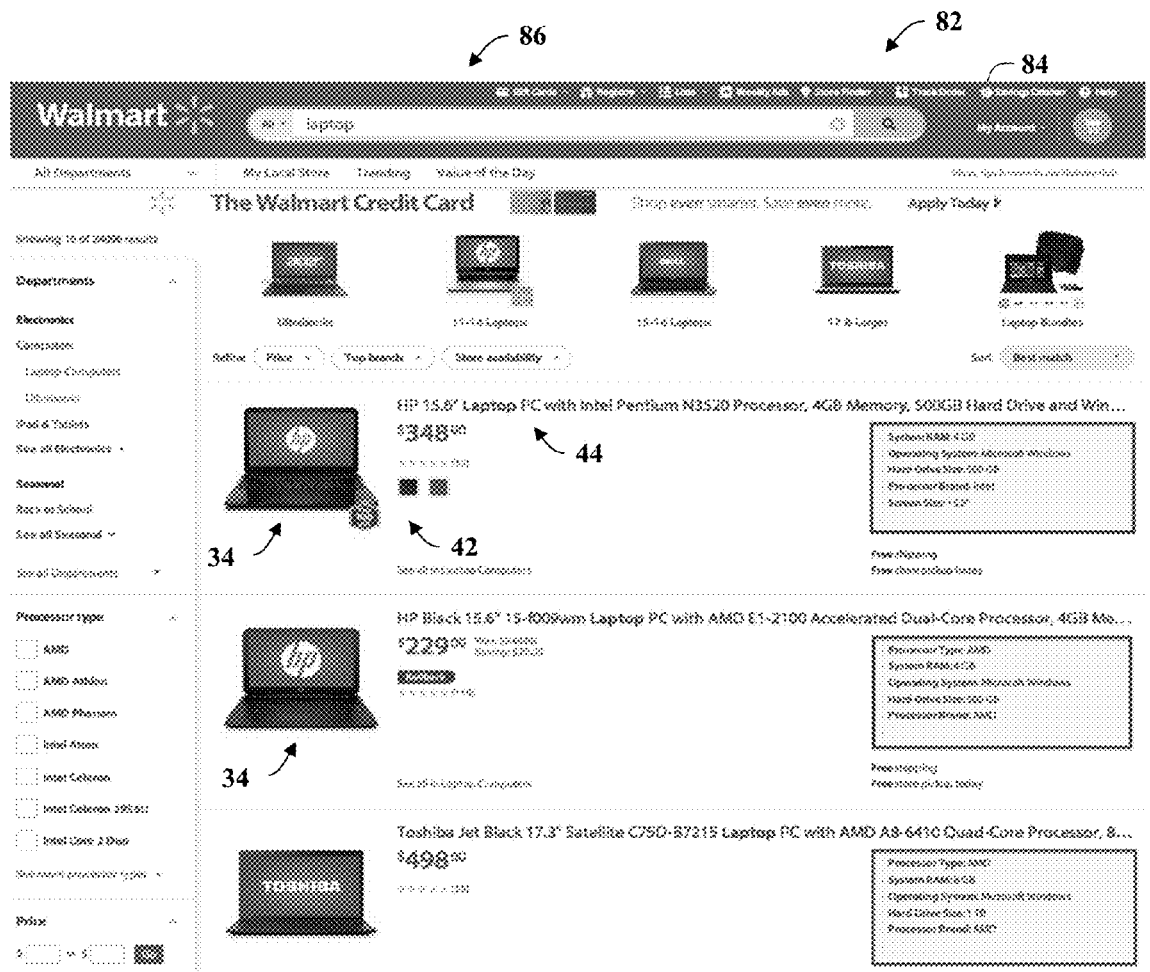
FIG. 7 is an illustration of an exemplary screenshot that may be generated by the system shown in FIGS. 1-3, according to embodiments of the present invention.

FIGS. 4-6 are flowcharts of methods 200, 300, and 400 that may be used to operate the multi-modal computer classification network system 10 for classifying product data records. The methods include a plurality of steps. Each method step may be performed independently of, or in combination with, other method steps. Portions of the methods may be performed by any one of, or any combination of, the components of the system 10. FIG. 7 are exemplary graphical displays that may be displayed by the system 10.

Referring to FIGS. 4-6, in the illustrated embodiment, in method step 202, the system 10 receives a request from a user to generate class labels for one or more item records. In response to receiving the request, the first classification computer server 16 initiates the text CNN classification program to access the item records database 30 and select an item record 32 from the item records database 30.

In method step 204, the text CNN classification program of the first classification computer server 16 generates a first classification record 50 using input data including the text classification metadata set 40 included in the selected item record 32 and a plurality of labeling records 74. The text CNN classification program generates the first classification record 50 including the item ID 36 from the selected item record 32, a first ranked list 52 of class labels 54 and a first classification probability 56 associated with each class label 54. The text CNN classification program generates the first ranked list of class labels using input data including the text classification metadata set included in the selected item record and the plurality of trusted labeling records. For example, in one embodiment, the text CNN classification program implements the method 300 illustrated in FIG. 5.

In method step 206, the second classification computer server 18 initiates the image CNN classification program to generate a second classification record 60 using input data including the image classification metadata set 42 included in the selected item record 32 and the labeling records 74. The image CNN classification program generates the second classification record 60 including the item ID 36 from the selected item record 32, a second ranked list 62 of class labels 54, and a second classification probability 64 for each class label 54. The image CNN classification program generates the second ranked list of class labels using input data including the trusted labeling records and the image classification metadata set included in the selected item record. In one embodiment, the image CNN classification program may include a VGG™ classifier that implements the method 400 illustrated in FIG. 6.

In method step 208, the policy network server 20 initiates the policy network program to generate a labeled item record 68 using input data that includes the output data from the first classification server 16 and the second classification server 18.

For example, the policy network program may use input data including the first classification record 50 and the second classification record 60 and determine a predicted class label 70 based on the first and second ranked lists of class labels and/or the corresponding first and second classification probabilities.

In method step 210, the policy network program generates the labeled item record 68 included the item ID 36 associated with the selected item record 32 and the predicted class label 70, and stores the labeled item record 68 in the labeled item database 66.

In method step 212, the website hosting server 12 displays a product search webpage 84 (shown in FIG. 7) in response to receiving a user request that allows a user to input a product search request including search criteria including one or more search terms. The website hosting server 12 receives the product search request from the user via the product search webpage 84 and transmits the product search request to the search engine server 14.

In method step 214, the search engine server 14 receives the product search request from the website hosting server 12, determines one or more desired product categories based on the received product search request, and accesses the labeled item database 66 to select labeled item records 68 having predicted class labels 70 matching the desired product categories. The search engine server 14 generates a relevance score associated with each selected labeled item record 68 that may be used to display the corresponding products in a ranked order, generates a product list as a function of the relevance scores associated with each labeled item record 68, and transmits the product lists to the website hosting server 12 for use in displaying the corresponding products 34 to the user via one or more search results webpages 84.

INDUSTRIAL APPLICABILITY

With reference to FIG. 1-14, operation of the system 10 according to one embodiment is shown. The system 10 may be used to monitor the operation of a classification model used to assign labels to items.

In one embodiment, the system 10 may include four different types of architectures. (1) Policies that learn from the text and image CNNs class probability inputs (shown in FIG. 3). For these policies architectures with one or two fully connected layers may be used, where the two-layered policy is using 10 hidden units and a ReLu non-linearity. (2) Policies that learn from the text and image inputs, for example an additional CNN as the policy network, either the text CNN or the VGG network. (3) Predefined policies, that either average the model predictions or choose the maximal confidence model. And (4), feature level-fusion, that concatenate the last hidden layer of each network followed by one to three fully connected layers. In order to train the polices (configurations 1 and 2), the labels are collected from the image and text networks predictions, i.e., the label is 1 if the image network made a correct prediction while the text network made a mistake, and 0 otherwise. On evaluation, the policy predictions are used to select between the models, i.e., if the policy prediction is 1 the image network is used, and the text network otherwise.

In one embodiment, the system 10 may use a data set that contains 1.2 million products (title image and shelf), that is collected from the Walmart.com website (offered online and can be viewed at the website), and were deemed the hardest to classify by the current production system. The data is divided into train (1.1 million) validation (50 k) and test (50 k). Both the image network and the text network are trained on the train data and evaluated on both the test data set, while the policy is trained on the validation data and is also evaluated on the test set. The objective is to classify the product's shelf, from 2890 possible choices. Each product is typically assigned to more than one shelf (3 on average), and the network is considered accurate if its maximal probability is referring to one of them.

Training the text architecture: In order to train the text CNN on the data set, the system builds a dictionary of all the words in the training data and embed each word using a random embedding into a one hundred dimensional vector. The system trim titles with more than 40 words and pad shorter titles with nulls. The system has experienced with different batch sizes, dropout rates, number of filters and filters stride, but found out the vanilla architecture works well on the data, in part because text CNNs are not very sensitive to hyper parameters. The system tuned the cost function positive coefficient parameter q; and found out that the value 30 performed best in practice (this value is also used for the image network). The optimal results that are achieved reached 70.1% accuracy on the test data set.

Training the image architecture: In order to train the VGG network on the data set, the only pre-processing performed is to re-size all the images into 224×224 pixels and reduce the image mean.

TABLE 1

VGG variants compared by their top-1 accuracy %

|  | Learning only the last layer | Fine tuning |
|---|---|---|
| Train | 36.7 | 88.2 |
| Test | 32.7 | 57 |

As shown in Table 1, fine-tuning the VGG network had a big impact on the final accuracy. While some works claim that the features learned by VGG on ImageNet are global feature extractors, fine tuning can significantly improve accuracy. This may be due to some of the ImageNet classes are irrelevant for e-commerce (e.g., vehicles and animals) while some relevant categories are misrepresented (e.g., electronics and office equipment). It could also be that the images in the dataset follow some specific pattern of white background, well-lit studio etc., that characterizes e-commerce.

It is also interesting to compare the results to the performance of the VGG network on ImageNet. The VGG network has achieved 75% on top-1 accuracy, while the best VGG variant has received only 57%. There are a few differences between these two data sets that may explain this gap (1) ImageNet has 15 million images while the dataset contains only 1.5 million (10%), (2) the dataset has 3 times more classes and contains multiple labels per image making it harder, and (3), some of the images are not informative for shelf classification.

Error analysis: Inspecting the results of the image and the text networks, it can be seen that the text network is outperforming the image network in shelf classification accuracy. This result has also been reported before, however, this is it is the first work that compares state of the art text and image CNNs on a real world large scale e-commerce data set.

What is the potential of multi-modality? In order to answer this question, a measure of the accuracy of the image and text networks on the test data set is done. Since the system combines the models, it also investigated the representation that each model learned. For that goal, the neural activations of each network's last hidden layer was collected and visualized it using tSNE.

The text network outperformed the image network on this data set, achieving an accuracy of 70.1% compared to the 56.7% obtained by the image network. More surprising, it is identified that for 7.8% of the products the image network made a correct prediction while the text network was wrong. This observation is encouraging since it implies that there is a relative big potential to harness via multi-modality. This large gap is surprising since different neural networks applied on the same problem tend to make the same mistakes.

Unification techniques for multi modal problems typically use the last hidden layer of each network as features. The activations of this layer are visualized using a tSNE map, which shows a map for the activations of the text model (the image model yielded similar results). In particular, regions in the tSNE map where the image predictions are correct and the text is wrong is reviewed. Finding such a region will imply that a policy network can learn good decision boundaries. However, as can be seen that there are no well-defined regions in the tSNE maps where the image network is correct and the title is wrong, thus implying that it might be hard to identify these products using the activations of the last layers.

Multi-modal unification techniques: The error analysis experiment demonstrates the potential of merging image with text. Still, it was hard to achieve the upper bound provided by the error analysis in practice. The policies may be used that managed to achieve performance boost in top-1 accuracy % over the text and image networks, and then provide discussion on the different approaches that were tried but didn't yield improvement.

Decision-level fusion: polices were trained from different data sources (e.g., title, image, and each CNN class probabilities), using different architectures and different hyper-parameters.

TABLE 2

| Index | Text | Image | Policy | Oracle | Policy acc |
|---|---|---|---|---|---|
| 1A5 | 70.1 | 56.7 | 71.4 (+1.3) | 77.5 (+7.8) | 86.4 |
| 2A5 | 70.1 | 56.6 | 71.5 (+1.4) | 77.6 (+7.5) | 84.2 |
| 2C5 | 70.1 | 56.6 | 71.4 (+1.3) | 77.6 (+7.5) | 84.6 |
| 2B5 | 70.2 | 56.7 | 71.8 (+1.6) | 77.7 (+7.5) | 84.2 |
| 2B1 | 70.2 | 56.7 | 70.2 (+0) | 77.7 (+7.5) | 92.5 |
| 2B7 | 70.0 | 56.6 | 71.0 (+1.0) | 77.5 (+7.5) | 79.1 |
| 2B10 | 70.1 | 56.6 | 70.7 (+0.6) | 77.6 (+7.5) | 75.0 |
| Image | 70.1 | 56.6 | 68.5 (−1.6) | 77.6 (+7.5) | 80.3 |
| Text | 70.1 | 56.6 | 69.0 (−1.1) | 77.6 (+7.5) | 83.7 |
| Both | 70.1 | 56.6 | 66.1 (−4) | 77.6 (+7.5) | 73.7 |
| Mean | 70.1 | 56.7 | 65.4 (+0) | 77.6 (+7.5) | — |
| Max | 70.1 | 56.7 | 60.1 (−10) | 77.7 (+7.6) | 38.2 |

Table 2 illustrates the accuracy % of the image, text and policy learners on the test data set. The accuracy of an oracle baseline (an optimal policy) is provided as well as the accuracy of the policy in choosing the image network (policy acc). The numbers in (+) refer to the performance boost over text and image networks. Index has 3 charters, the first number corresponds to the number of layers in the policy network (i.e., one or two), the second character corresponds to the number of class probabilities used as input to the policy (i.e. A for 1, B for 3, and C for all) and the last number corresponds to the value of q: The last four rows correspond to policies that were trained from image and text inputs and for pre-defined polices that were not trained (mean, max).

Looking at Table 2, it can be seen that the best policies were trained using the class probabilities (the softmax probabilities) of the image and text CNNs as inputs. The amount of class probabilities that were used (top-1, top-3 or all) did not had a significant effect on the results, indicating that the top-1 probability contains enough information to learn good policies. This result makes sense, since the top-1 probability measures the confidence of the network in making a prediction. Still, the top-3 probabilities performed slightly better, indicating that maybe also the difference between the top probabilities matter. It can also be seen that the 2-layer architecture outperformed the 1-layer, indicating that a linear policy is too simple, and deeper models can yield better results. Last, the cost function positive coefficient q had a big impact on the results. It can be seen that for q=1, the policy network is more accurate in its prediction however it achieves worse results on shelf classification. For q=5 it gets the best results, while higher values of q (e.g., 7 or 10) resulted with inaccurate policies that did not perform well in practice.

This is the first work demonstrating a direct performance improvement on top-1 classification accuracy from using images and text on a large scale classification problem. While it may not seem surprising that combining text and image will yield better models, in practice it found it extremely hard to leverage this potential. Also note that there is still a big gap between the best policy and the oracle, which may be reduced.

Other Policies: pre-defined policies that do not learn from the data were also used. Specifically, it tried to average the logits, and to choose the network with the maximal confidence. Both of these experiments yielded significantly worse results, probably, since the text network is much more accurate than the image one (Table 2). It also tried to learn policies directly from input, using a policy network which is either a text CNN, a VGG network or a combination. However, all of these experiments resulted with policies that over fitted the data and performed worse than the title model on the test data (Table 2). It also experienced with early stopping criteria, various regularization methods (dropout, 11, 12) and reduced model size but none could make the policy network generalize.

Feature-level fusion: Training an end to end differentiated architecture can be very tricky. For example, each input source has its own specific architecture, with different learning rate and optimization algorithm. Therefore it experienced with training the network end-to-end, but also with first training each part separately and then learning the concatenated parts. Different unification approaches were tried such as gating functions, cross products and different number of fully connected layers after the concatenation. All of these experiments resulted with models that were inferior to the text model. While this may seem surprising, the only successful feature level fusion, was not able to gain accuracy improvement on top-1 accuracy.

In one embodiment, the system performed a multi-modal multi-class multi-label product classification problem and the presented results on a challenging real world data set that was collected from the Walmart.com web site. The text network outperforms the image network on the data set, and provided error analysis experiments. It is suggested that there is a big potential in forging text and image inputs for product classification. Finally, it is suggested that a multi-modal decision-level fusion approach that leverages state of the art results from image and text classification and forges them into a multi-modal architecture that outperforms both.

Although it was only able to achieve a small fraction from the potential of multi-modality. The system may include deeper policy networks and more sophisticated measures of confidence, and ensembles of image networks and text networks. It is believed that the insights from training policy networks will eventually lead to training an end to end differential multi-modal networks.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A multi-modal computer classification network system comprising:
   a memory device including an item records database and a labeling database, the item records database including a plurality of item records, each item record of the plurality of item records including an item ID, a first classification metadata set, and a second classification metadata set, the labeling database including a plurality of labeling records, each labeling record of the plurality of labeling records including a class label and labeling data;
   a first classification computer server including a first classifier program configured to:
      select an item record from the item records database; and
      generate a first classification record including a first ranked list of class labels, the first ranked list of class labels generated using first input data including the plurality of labeling records and the first classification metadata set included in the item record as selected;
   a second classification computer server including a second classifier program configured to:
      generate a second classification record including a second ranked list of class labels, the second ranked list of class labels generated using second input data including the plurality of labeling records and the second classification metadata set included in the item record as selected;
   a policy computer server including a policy network programmed to:
      determine a predicted class label based on the first and second ranked lists of class labels;
      generate a labeled item record including the item ID included in the item record, as selected, and the predicted class label; and
      generate a plurality of labeled item records and store the plurality of labeled item records in a labeled item database; and
   a web server including a processor programmed to:
      generate and display a product search website on a user computing device;
      receive, from a user via the user computing device, a product search request;
      determine a product category based on the product search request as received;
      access the labeled item database and select labeled item records having predicted class labels matching the product category; and
      generate and display a product search result webpage including product information associated with the selected labeled item records.

2. The system of claim 1, wherein the policy network includes at least one of a Convolutional Neural Network (CNN), a logistic regression, a Support Vector Machine (SVM), a Generic Neural Network, or a Random Forest classifier.

3. The system of claim 1, wherein the first classification metadata set includes text data.

4. The system of claim 3, wherein the second classification metadata set includes image data.

5. The system of claim 3, wherein the second classification metadata set includes video data.

6. The system of claim 1, wherein the first classifier program includes a text CNN classifier and the second classifier program includes an image CNN classifier.

7. The system of claim 6, wherein the image CNN classifier is a VGG network.

8. A multi-modal computer classification network system comprising:
   a memory device including an item records database and a labeling database, the item records database including a plurality of item records, each item record of the plurality of item records including an item ID, a first classification metadata set, and a second classification metadata set, the labeling database including a plurality of labeling records, each labeling record of the plurality of labeling records including a class label and labeling data;
   a first classification computer server including a first classifier program configured to:
      select an item record from the item records database; and
      generate a first classification record including a first ranked list of class labels, the first ranked list of class labels generated using first input data including the plurality of labeling records and the first classification metadata set included in the item record as selected;
   a second classification computer server including a second classifier program configured to:
      generate a second classification record including a second ranked list of class labels, the second ranked list of class labels generated using second input data including the plurality of labeling records and the second classification metadata set included in the item record as selected; and
   a policy computer server including a policy network programmed to:
      determine a predicted class label based on the first and second ranked lists of class labels; and
      generate a labeled item record including the item ID included in the item record, as selected, and the predicted class label, wherein:
         the first classifier program is further configured to generate a first classification probability associated with each class label included in the first ranked list of class labels;
         the second classifier program is configured to generate a second classification probability associated with each class label included in the second ranked list of class labels;
         the policy network is programmed to determine the predicted class label based on the first and second ranked lists of class labels and the corresponding first and second classification probabilities.

9. One or more non-transitory computer-readable storage media, having computer-executable instructions embodied thereon, that, when executed by at least one processor, the computer-executable instructions cause the at least one processor to function as:
   a first classification computer server including a first classifier program configured to:
      access a memory device including an item records database and a labeling database, the item records database including a plurality of item records, each item record of the plurality of item records including an item ID, a first classification metadata set, and a second classification metadata set, the labeling database including a plurality of labeling records, each labeling record of the plurality of labeling records including a class label and labeling data;

select an item record from the item records database; and generate a first classification record including a first ranked list of class labels, the first ranked list of class labels generated using first input data including the plurality of labeling records and the first classification metadata set included in the item record as selected;

a second classification computer server including a second classifier program configured to:

generate a second classification record including a second ranked list of class labels, the second ranked list of class labels generated using second input data including the plurality of labeling records and the second classification metadata set included in the item record as selected;

a policy computer server including a policy network programmed to:

determine a predicted class label based on the first and second ranked lists of class labels;

generate a labeled item record including the item ID included in the item record, as selected, and the predicted class label; and generate a plurality of labeled item records and store the plurality of labeled item records in a labeled item database; and a web server including a processor programmed to:

generate and display a product search website on a user computing device;

receive, from a user via the user computing device, a product search request;

determine a product category based on the product search request as received;

access the labeled item database and select labeled item records having predicted class labels matching the product category; and generate and display a product search result webpage including product information associated with the selected labeled item records.

10. The one or more non-transitory computer-readable storage media of claim 9, wherein the policy network includes at least one of a Convolutional Neural Network (CNN), a logistic regression, a Support Vector Machine (SVM), a Generic Neural Network, or a Random Forest classifier.

11. The one or more non-transitory computer-readable storage media of claim 9, wherein the first classification metadata set includes text data.

12. The one or more non-transitory computer-readable storage media of claim 11, wherein the second classification metadata set includes image data.

13. The one or more non-transitory computer-readable storage media of claim 11, wherein the second classification metadata set includes video data.

14. The one or more non-transitory computer-readable storage media of claim 9, wherein the first classifier includes a text CNN classifier and the second classifier includes an image CNN classifier.

15. The one or more non-transitory computer-readable storage media of claim 14, wherein the image CNN classifier is a VGG network.

16. One or more non-transitory computer-readable storage media, having computer-executable instructions embodied thereon, that, when executed by at least one processor, the computer-executable instructions cause the at least one processor to function as:

a first classification computer server including a first classifier program configured to:

access a memory device including an item records database and a labeling database, the item records database including a plurality of item records, each item record of the plurality of item records including an item ID, a first classification metadata set, and a second classification metadata set, the labeling database including a plurality of labeling records, each labeling record of the plurality of labeling records including a class label and labeling data;

select an item record from the item records database; and generate a first classification record including a first ranked list of class labels, the first ranked list of class labels generated using input data including the plurality of labeling records and the first classification metadata set included in the item record as selected;

a second classification computer server including a second classifier program configured to:

generate a second classification record including a second ranked list of class labels, the second ranked list of class labels generated using input data including the plurality of labeling records and the second classification metadata set included in the item record as selected; and a policy computer server including a policy network programmed to:

determine a predicted class label based on the first and second ranked lists of class labels; and generate a labeled item record including the item ID included in the item record as selected and the predicted class label, wherein:

the first classifier program is further configured to generate a first classification probability associated with each class label included in the first ranked list of class labels;

the second classifier program is configured to generate a second classification probability associated with each class label included in the second ranked list of class labels; and the policy network is programmed to determine the predicted class label based on the first and second ranked lists of class labels and the corresponding first and second classification probabilities.

17. A computer-implemented method for operating a multi-modal computer classification network system, the computer implemented method including steps of:

generating and storing, by a memory device, an item records database and a labeling database, the item records database including a plurality of item records, each item record of the plurality of item records including an item ID, a first classification metadata set, and a second classification metadata set, the labeling database including a plurality of labeling records, each labeling record of the plurality of labeling records including a class label and labeling data;

execute, on a first classification computer server, a first classifier program configured to:

select an item record from the item records database; and generate a first classification record including a first ranked list of class labels, the first ranked list of class labels generated using first input data including the plurality of labeling records and the first classification metadata set included in the item record as selected;

execute, on a second classification computer server, a second classifier program configured to:
  generate a second classification record including a second ranked list of class labels, the second ranked list of class labels generated using second input data including the plurality of labeling records and the second classification metadata set included in the item record as selected;
execute, on a policy computer server including a policy network, a program configured to:
  determine a predicted class label based on the first and second ranked lists of class labels;
  generate a labeled item record including the item ID included in the item record as selected and the predicted class label; and
  generate a plurality of labeled item records and store the plurality of labeled item records in a labeled item database; and
execute, on a web server including a processor, a program configured to:
  generate and display a product search website on a user computing device;
  receive, from a user via the user computing device, a product search request;
  determine a product category based on the product search request as received;
  access the labeled item database and select labeled item records having predicted class labels matching the product category; and
  generate and display a product search result webpage including product information associated with the selected labeled item records.

18. The computer-implemented method of claim 17, wherein the policy network includes at least one of a Convolutional Neural Network (CNN), a logistic regression, a Support Vector Machine (SVM), a Generic Neural Network, or a Random Forest classifier.

19. The computer-implemented method of claim 17, wherein:
  the first classifier program is further configured to generate a first classification probability associated with each class label included in the first ranked list of class labels;
  the second classifier program is configured to generate a second classification probability associated with each class label included in the second ranked list of class labels;
  the policy network is programmed to determine the predicted class label based on the first and second ranked lists of class labels and the corresponding first and second classification probabilities.

20. The computer-implemented method of claim 17, wherein the first classification metadata set includes text data.

* * * * *